(12) United States Patent
Cartier

(10) Patent No.: US 11,021,994 B2
(45) Date of Patent: Jun. 1, 2021

(54) FLANGED INTEGRAL PISTON BEARING

(71) Applicant: PRATT & WHITNEY CANADA CORP., Longueuil (CA)

(72) Inventor: Simon Cartier, St-Bruno de Montarville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/671,485

(22) Filed: Nov. 1, 2019

(65) Prior Publication Data
US 2021/0131306 A1    May 6, 2021

(51) Int. Cl.
| | |
|---|---|
| F01D 25/16 | (2006.01) |
| F16C 25/08 | (2006.01) |
| F16C 33/66 | (2006.01) |
| F16C 19/08 | (2006.01) |
| F16C 19/18 | (2006.01) |

(52) U.S. Cl.
CPC ............ *F01D 25/162* (2013.01); *F16C 19/08* (2013.01); *F16C 19/182* (2013.01); *F16C 25/083* (2013.01); *F05D 2220/323* (2013.01); *F05D 2240/52* (2013.01); *F05D 2240/54* (2013.01); *F05D 2270/093* (2013.01); *F16C 33/6637* (2013.01); *Y10T 29/49904* (2015.01)

(58) Field of Classification Search
CPC ...... F16C 19/08; F16C 19/182; F16C 25/083; F16C 33/6638; F16C 33/6637; F01D 25/162; F01D 25/243; F05D 2220/323; F05D 2240/52; F05D 2270/093; F05D 2240/54; Y10T 29/49904

USPC .......... 384/504, 517, 611, 613, 616; 415/229
See application file for complete search history.

(56) References Cited

U.S. PATENT DOCUMENTS

| | | | | |
|---|---|---|---|---|
| 3,738,719 | A * | 6/1973 | Langner | F16C 41/02 384/517 |
| 4,657,412 | A * | 4/1987 | McLarty | B23Q 1/265 384/1 |
| 4,676,667 | A * | 6/1987 | Komatsu | F01D 25/16 384/517 |
| 5,051,005 | A * | 9/1991 | Duncan | F16C 25/08 384/517 |
| 6,048,101 | A * | 4/2000 | Rasmussen | F01C 21/02 384/616 |
| 6,123,462 | A * | 9/2000 | Crowell | F16C 25/08 384/517 |

(Continued)

FOREIGN PATENT DOCUMENTS

| | | | | |
|---|---|---|---|---|
| CN | 102979625 A | * | 3/2013 | |
| CN | 102985710 A | * | 3/2013 | ............ F16C 19/54 |

(Continued)

*Primary Examiner* — Marcus Charles
(74) *Attorney, Agent, or Firm* — Norton Rose Fulbright Canada LLP

(57) ABSTRACT

A method of operating a gas turbine engine of a multi-engine aircraft is disclosed, where the gas turbine engine has an engine shaft mounted for rotation in a bearing of a bearing assembly. The method comprises limiting motive power supplied to the aircraft by the gas turbine engine by operating the gas turbine engine in a standby mode; and when the gas turbine engine is operating in the standby mode, using an oil piston integrated in the bearing supporting the engine shaft of the gas turbine engine to generate an axial preload force on the bearing.

17 Claims, 6 Drawing Sheets

(56) References Cited

U.S. PATENT DOCUMENTS

| | | | | |
|---|---|---|---|---|
| 6,843,623 B2* | 1/2005 | Geissler | .................... | B23Q 1/70 |
| | | | | 409/231 |
| 7,997,804 B2* | 8/2011 | Koda | ...................... | F16C 25/08 |
| | | | | 384/556 |
| 8,439,637 B2* | 5/2013 | DiBenedetto | ........... | F02C 3/107 |
| | | | | 415/229 |
| 9,046,130 B2 | 6/2015 | Kachinski | | |
| 9,702,404 B2* | 7/2017 | Smedresman | ........... | F16C 23/08 |
| 2011/0026867 A1* | 2/2011 | Hamada | ................ | F16C 19/364 |
| | | | | 384/571 |
| 2014/0369830 A1* | 12/2014 | Fletcher | .................. | F01D 25/16 |
| | | | | 415/229 |
| 2016/0069385 A1* | 3/2016 | Kim | ...................... | B23Q 1/265 |
| | | | | 384/479 |
| 2018/0038378 A1* | 2/2018 | DiBenedetto | ......... | F04D 29/051 |
| 2018/0050811 A1* | 2/2018 | Niergarth | ................ | B64C 21/06 |
| 2019/0195088 A1* | 6/2019 | Duffy | ..................... | F16C 35/04 |

FOREIGN PATENT DOCUMENTS

| | | | | |
|---|---|---|---|---|
| CN | 109281944 | | 1/2019 | |
| EP | E P-2921729 A2 * | | 9/2015 | ............ F16C 19/547 |
| EP | 3502497 A1 * | | 6/2019 | .............. F16C 19/16 |
| JP | 1996035521 | | 2/1996 | |
| WO | WO-2011139310 A2 * | | 11/2011 | ........... F01D 25/162 |
| WO | WO-2017029006 A1 * | | 2/2017 | ............ F16C 25/083 |

\* cited by examiner

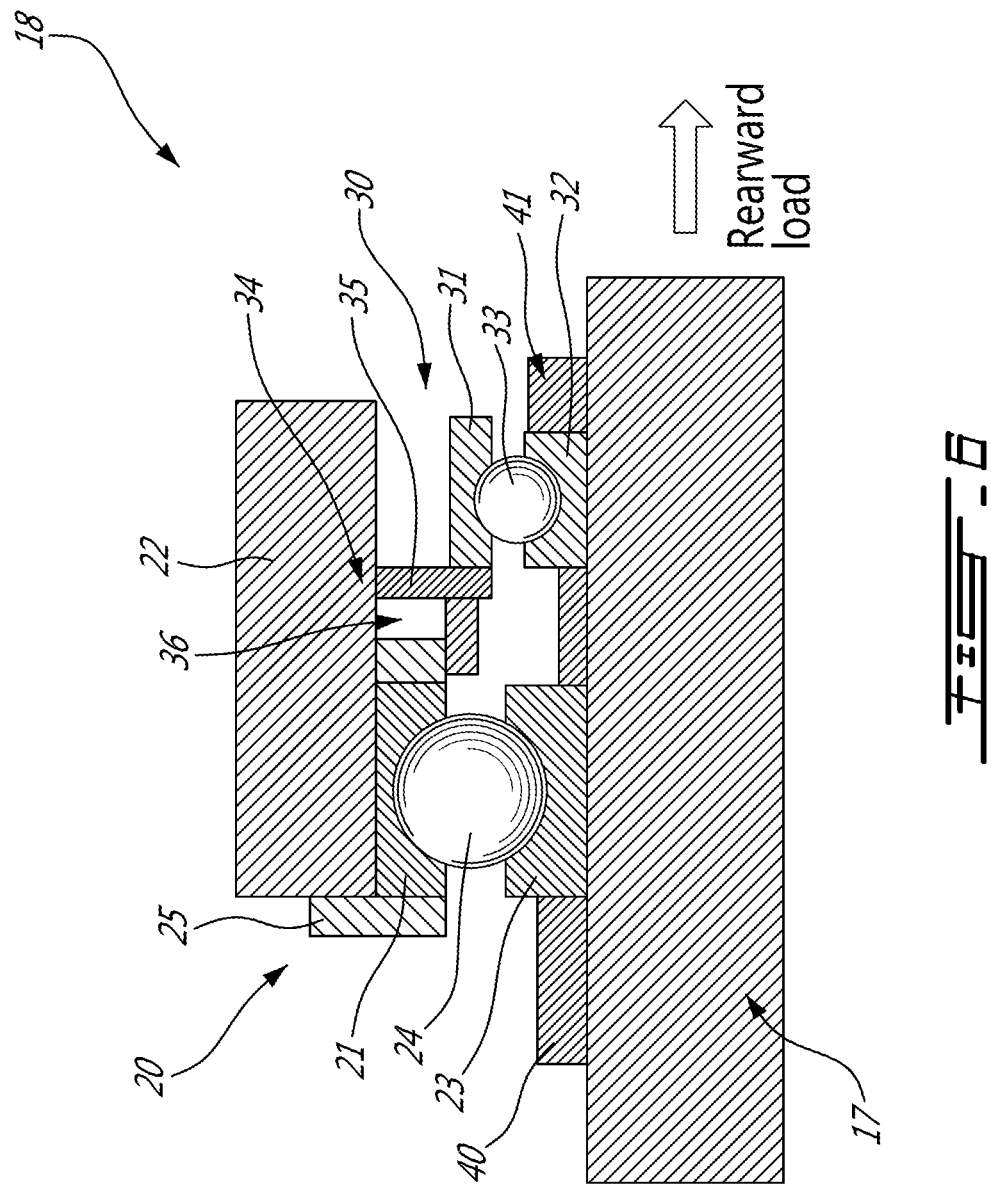

FLANGED INTEGRAL PISTON BEARING

TECHNICAL FIELD

The disclosure relates generally to multi-engine aircraft and methods of operating same, and more particularly to operation of an aircraft propulsion gas turbine engine in a multi-engine aircraft.

BACKGROUND

In multi-engine aircraft, such as helicopters, two or more propulsion gas turbine engines may be provided to drive a main rotor via a common gearbox, and each of the engines is sized to provide power greater than what is required for cruising using both/all engines. It can however be desirable to operate one of the engines at a very low power output (e.g. "standby" condition) during cruise, in order to reduce fuel consumption of this engine.

However, because most gas turbine engines are designed to run optimally at power outputs greater than the very low power conditions of such a standby mode, a number of considerations must be taken into account in order to be able to effectively operate one of the engines in a low power mode.

SUMMARY

There is accordingly provided a method of operating a gas turbine engine of a multi-engine aircraft, the gas turbine engine having an engine shaft mounted for rotation in a bearing of a bearing assembly, the method comprising: limiting motive power supplied to the aircraft by the gas turbine engine by operating the gas turbine engine in a standby mode; and when the gas turbine engine is operating in the standby mode, using an oil piston integrated in the bearing supporting the engine shaft of the gas turbine engine to generate an axial preload force on the bearing.

There is further provided a method of providing a preload force on a bearing of a bearing assembly, the bearing supporting a shaft in a gas turbine engine, the method comprising: using an oil piston integrated into a flange of the bearing to apply an axial force on an outer race of the bearing, the axial force being applied continuously on the bearing during operation of the gas turbine engine.

There is further provided a bearing assembly for supporting an engine shaft, comprising: a bearing having an inner race, an outer race and a series of rolling elements disposed between the inner race and the outer race, the inner race of the bearing coupled to the engine shaft, the outer race of the bearing defining a flange; and an oil piston integrated into the bearing flange, the oil piston including a piston cavity, the bearing flange at least partially circumscribing the piston cavity, the oil piston configured to apply an axial preload force against the rolling elements of the bearing and in turn to the engine shaft coupled to the bearing inner race.

Further details of these and other aspects of the subject matter of this application will be apparent from the detailed description included below and the drawings.

BRIEF DESCRIPTION OF THE DRAWINGS

FIG. 6 is another schematic axial sectional view like FIG. 5 with an alternate configuration of the bearing assembly.

DETAILED DESCRIPTION

Figure 1:
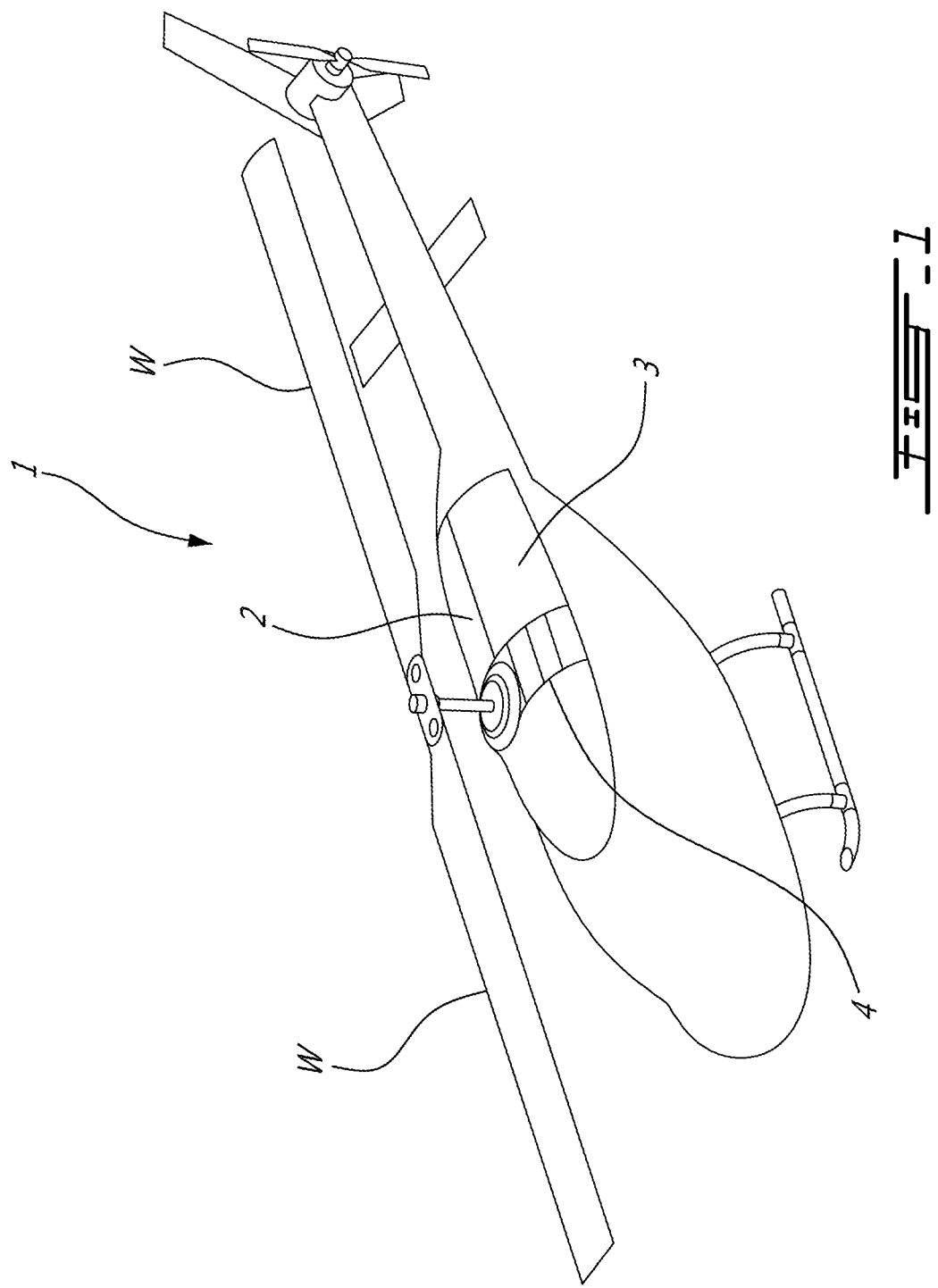
FIG. 1 is a schematic view of an example multi-engine aircraft comprising a dual engine helicopter.

FIG. 1 depicts an exemplary multi-engine aircraft 1, such as a helicopter. The aircraft 1 may however also be a multi-engine fixed-wing aircraft. The aircraft 1 includes at least two gas turbine engines 2 and 3 that may be interconnected by a common gearbox 4 to form a multi-engine drive system 5 as shown in FIG. 2.

Figure 2:
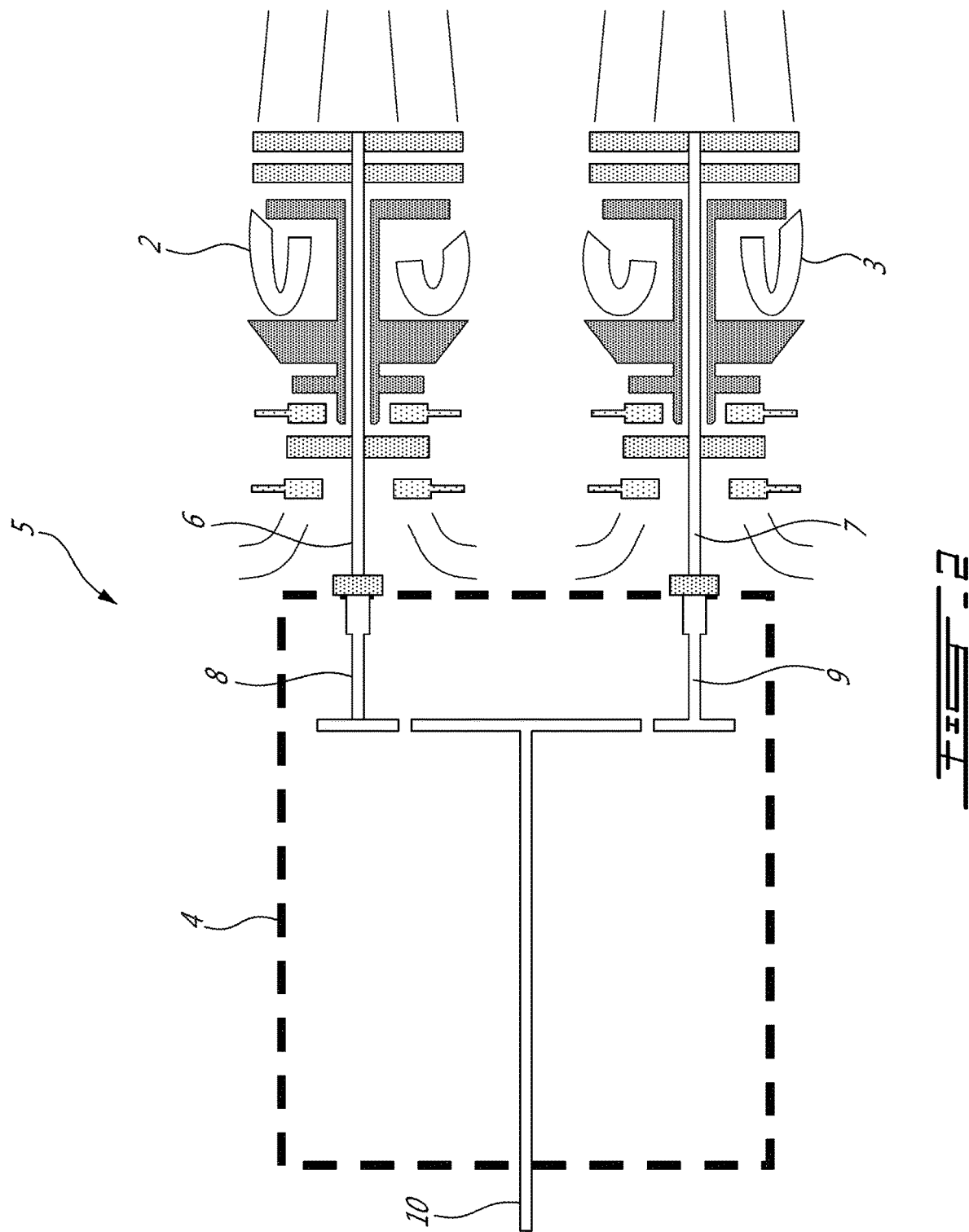
FIG. 2 is a schematic axial sectional view through the dual engines of the aircraft in FIG. 1 with the engine connector shafts joined to the helicopter gearbox.

FIG. 2 illustrates a schematic representation of an exemplary multi-engine system 5 that may be used as a power plant for the aircraft 1. The multi-engine system 5 comprises two or more gas turbine engines 2, 3. In addition to airborne applications, the multi-engine system 5 may be used in marine or industrial applications. The multi-engine system 5 of FIG. 2 includes main and reserve turboshaft gas turbine engines 2, 3 each having an engine shaft 6, 7 that are interconnected by a connector shaft 8, 9 of the common gearbox 4 to drive a common load shaft 10. In one embodiment, the common load shaft 10 may drive a rotary wing of a rotary-wing aircraft.

Each of turboshaft engines 2, 3 may be drivingly coupled to the common load shaft 10 via the gearbox 4, which may be of a speed-reduction type. The gear box 4 may be configured to permit the common load shaft 10 to be driven by either of the turboshaft engines 2, 3 alone, or by a combination of both engines 2, 3 operating together. During idle cruise regime operation, one engine 2 is operated to deliver motive power while the other engine 3 is in idle mode. For example an idle cruise regime may be used in multi-engine aircraft 1 to reduce fuel consumption during cruise operation while both engines 2, 3 may be operated with full power during takeoff, landing or during an emergency. In marine or industrial applications, low power demands may occur when one engine 2 is sufficient for the demand and the other engine 3 may be operated in idle mode to reduce fuel consumption and serve as a standby.

Figure 3:
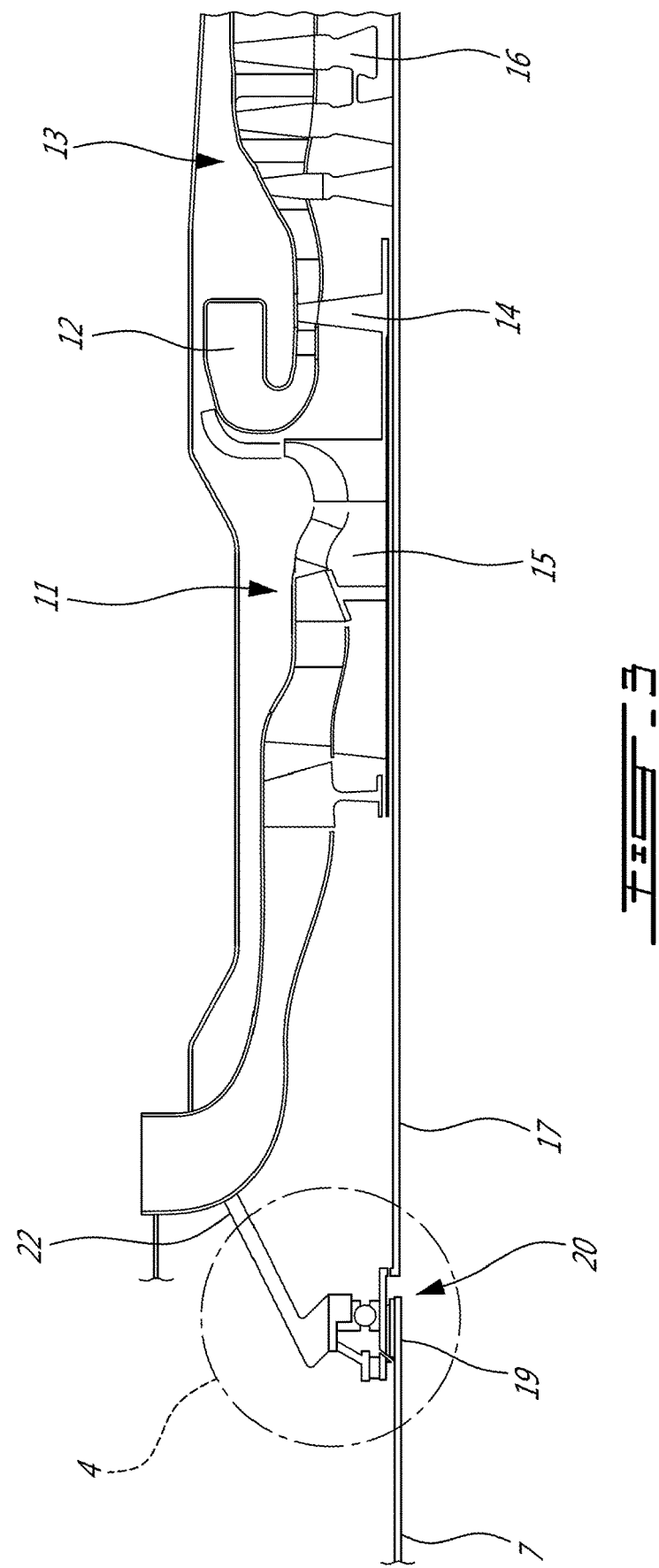
FIG. 3 is a partial axial cross-sectional view through an engine showing a forward bearing supporting an engine shaft.

Referring to FIG. 3, the gas turbine engines 2, 3 generally include, in serial flow communication, a compressor section 11 for pressurizing the air, a combustor 12 in where the compressed air is mixed with fuel and ignited for generating an annular stream of hot combustion gases, and a turbine section 13 for extracting energy from the combustion gases. In the embodiment of FIG. 3, a high pressure turbine 14 drives a high pressure engine shaft 15 to which both the compressor section 11 are connected for driving the high pressure engine shaft 15. A low pressure turbine 16 drives a low pressure turbine shaft 17 which is coaxial with the high pressure engine shaft 15.

Figure 4:
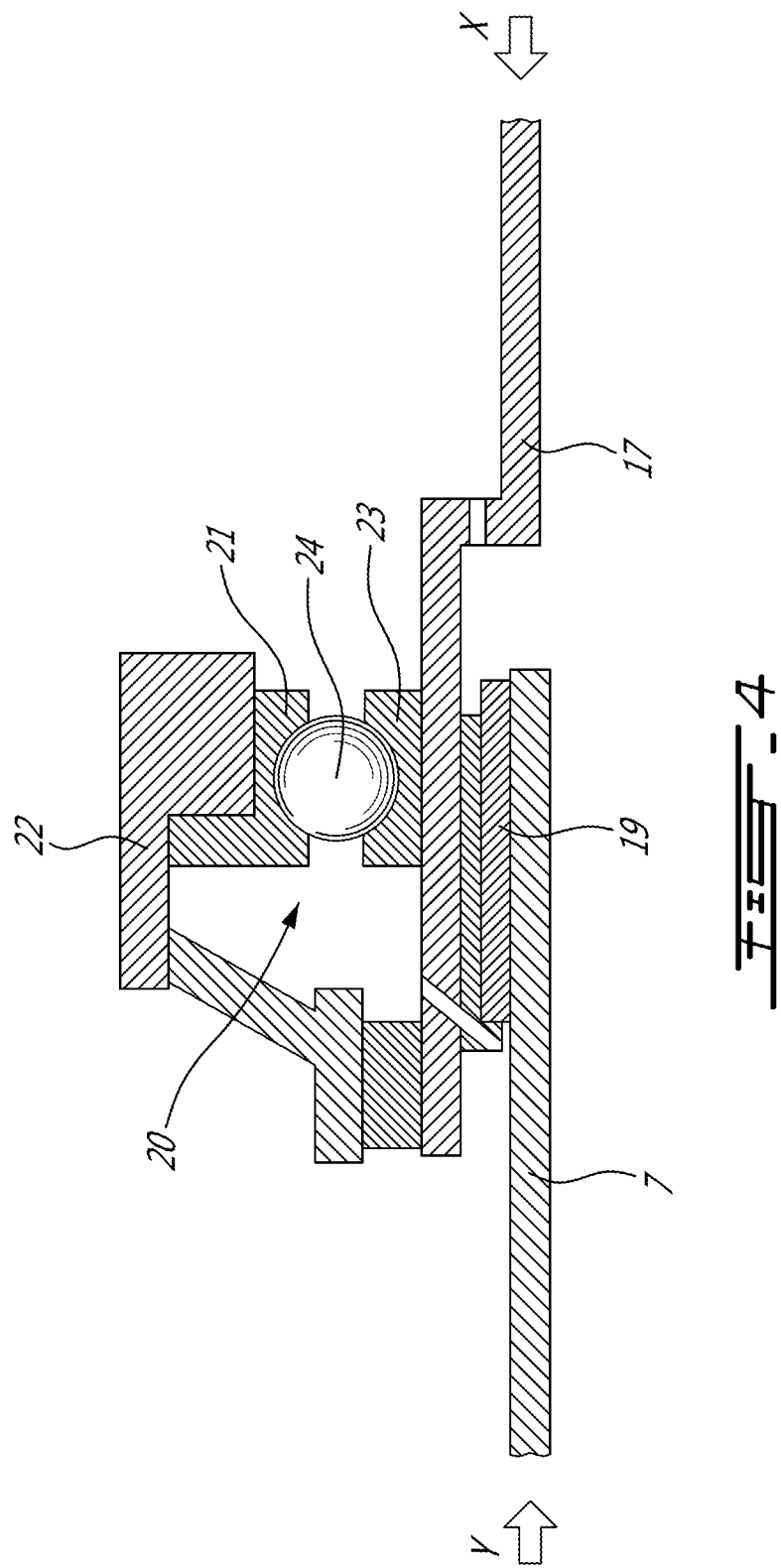
FIG. 4 is a detail axial sectional view, taken from region 4 in FIG. 3, showing the forward bearing of engine.

Referring to FIGS. 3 and 4, the low pressure turbine shaft 17 is supported by the forward bearing 20. A sliding spline joint 19 connects the engine output shaft 7 and the low pressure turbine shaft 17. As indicated in FIG. 2, the engine output shafts 6, 7 drive the connector shafts 8, 9, the gearbox 4, and the common load shaft 10.

The present description relates generally to operating a multi-engine system 1, where one engine 2 is capable of providing motive power, and a second engine 3 may be maintained in a very low-power, or idle mode to reduce fuel consumption while remaining on standby or reserve if needed for additional motive power.

With reference to the gas turbine engines 2, 3 as illustrated in FIG. 2, control of the multi-engine system 5 comprising these two engines 2, 3 is effected by one or more controller (s), which may be FADEC(s), electronic engine controller(s) (EEC(s)), or the like, that are programmed to manage, the operation of the engines to reduce an overall fuel burn, particularly during sustained cruise operating regimes, wherein the helicopter is operated at a sustained (steady-state) cruising speed and altitude. The cruise operating regime is typically associated with the operation of prior art engines at equivalent part-power, such that each engine contributes approximately equally to the output power of the multi-engine system. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

While the helicopter conditions (cruise speed and altitude) are substantially stable, the engines 2, 3 of the multi-engine system 5 may be operated asymmetrically, with one engine operated in a high-power "active" mode and the other engine operated in a low-power "standby" mode. Doing so may provide fuel saving opportunities to the helicopter, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric mode, which may be engaged during a helicopter cruise phase of flight (continuous, steady-state flight which is typically at a given commanded constant helicopter cruising speed and altitude). The multi-engine system may be used in an aircraft, such as a helicopter, but also has applications in suitable marine and/or industrial applications or other ground operations.

According to the present description, the multi-engine system 5 driving the helicopter 1 may be operated in this asymmetric mode, in which a first of the turboshaft engines (say, the first engine 2) may be operated at high power in an active mode and a second engine (say, the second engine 3) may be operated in a low-power standby mode. In one example, the first turboshaft engine 2 may be controlled by the controller(s) to run at full (or near-full) power conditions in the active mode, to supply substantially all or all of a required power and/or speed demand of the common load. The second turboshaft engine 3 may be controlled by the controller(s) to run at low-power or no-output-power conditions to supply substantially none or none of a required power and/or speed demand of the common load. Optionally, a clutch may be provided to declutch the low-power engine. Controller(s) may control the engine's governing on power according to an appropriate schedule or control regime. The controller(s) may comprise a first controller for controlling the first engine and a second controller for controlling the second engine. The first controller and the second controller may be in communication with each other in order to implement the operations described herein. In some embodiments, a single controller may be used for controlling the first engine and the second engine.

In another example, an asymmetric operating regime of the engines may be achieved through the one or more controller's differential control of fuel flow to the engines, as described in pending application Ser. No. 16/535,256, the entire contents of which are incorporated herein by reference. Low fuel flow may also include zero fuel flow in some examples. In another example, the engine system may be operated in an asymmetric operating regime by control of the relative speed of the engines using controller(s), that is, the standby engine is controlled to a target low speed or "sub-idle" speed and the active engine is controlled to a target high speed. Still other control regimes may be available for operating the engines in the asymmetric operating regime, such as control based on a target pressure ratio, or other suitable control parameters. Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

When one of the two engines, such as the second engine 3, is run in the standby mode as described above, a significantly lower axial load is generated on the forward bearing 20 of the standby engine relative to the "active" engine providing full power. This lower axial load may be limited to the aerodynamic load imposed by the low pressure turbines and/or compressors operating under such standby conditions. Consequently, the forward bearing can be left practically free of axial loading from the engine and subjected to alternating axial loads generated by helicopter main rotor load in load fluctuations from the helicopter gear box and helicopter rotor blades. This is undesirable for bearing structural integrity, as many bearings, and particularly ball bearings, require a certain amount of axial loading to be maintained in order to ensure maximize service life.

Referring now to FIG. 4, the present description will now refer in particular to the forward bearing 20 and the means by which a minimal axial load or preload is applied to avoid load reversals and reduce wear will be described with reference to features of an exemplary axial pre-load device depicted at FIG. 5. As noted above, the idle cruise regime condition generates a significantly low axial load on the forward bearing 20, generally limited to the aerodynamic load delivered by the low pressure turbines 16 operating under idle conditions. In the example of FIG. 4, the forward bearing 20 is substantially free (substantially free or almost free) of axial loading (arrow X) from the low pressure engine shaft 17 and is subjected to possibly alternating directional axial load (arrow Y) transmitted by the engine output shaft 7 originating from the helicopter main rotor load fluctuations transmitted by the helicopter gearbox 4 and helicopter rotor blades (W—see FIG. 1). The helicopter main rotor load fluctuations are due to vibrations and relative motion between the helicopter gearbox 4 and the connector shafts 8, 9. The relative motion tends to alternatively load the forward bearing 20. The outer race 21 of the forward bearing 20 is attached to the stationary engine casing 22 while the inner race 23 is mounted to the engine rotor (including the low pressure engine shaft 17 and engine output shaft 7). The alternating bearing loading condition is not desirable for structural integrity of the forward bearing 20 and a reduced bearing service life may result. Preferably the axial load on the ball 24, outer race 21 and inner race 23 does not alternate in axial direction but remains preloaded or uni-directional at an axial load value above a minimum axial load value. Although the Figures illustrate a ball 24 as a bearing member, it will be understood that other suitable rolling members capable of transmitting axial loads may also be used, such as conical rollers.

Figure 5:
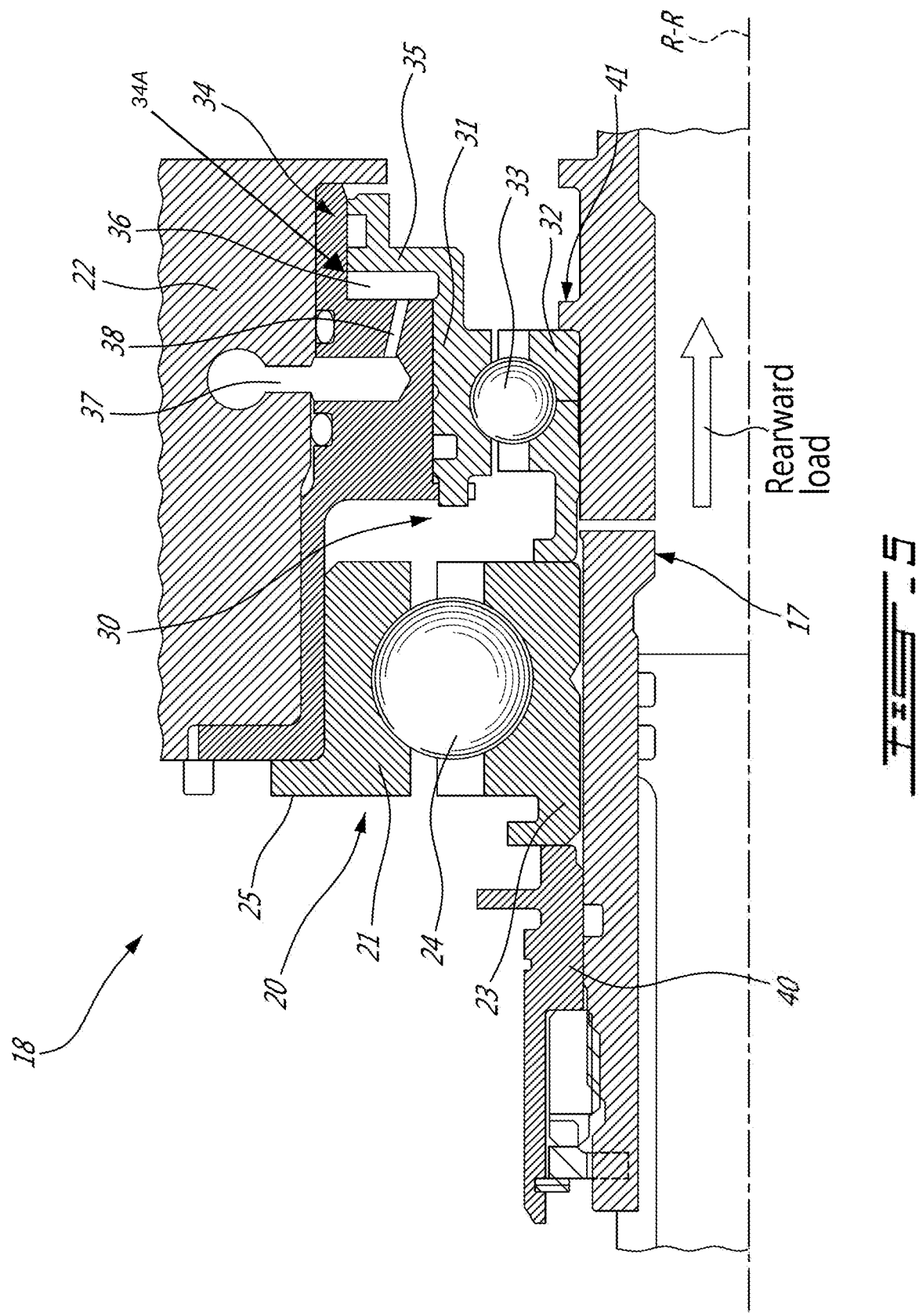
FIG. 5 is a schematic axial sectional view showing the engine shaft mounted for rotation in a bearing assembly.

FIG. 5 shows a schematic axial sectional view showing the low pressure engine shaft 17 mounted to the stationary engine casing 22 via a bearing assembly 18. As depicted, the bearing assembly 18 includes the forward bearing 20 mounted in tandem configuration with an auxiliary bearing 30.

The auxiliary bearing 30 has an outer race 31 and an inner race 32, and rolling elements 33, shown as balls in the depicted embodiment. The parts of the auxiliary bearing 30 may be made of any suitable material, such as stainless steel, ceramic, or a combination thereof, for instance.

The auxiliary bearing 30 may or may not be dimensioned or made of the same material as the forward bearing 20, depending on the embodiments. While in the depicted embodiment, the forward bearing 20, which may also be referred to as the main bearing of the engine 2,3 in some embodiments, is located axially closer to the gearbox 4 than the auxiliary bearing 30, their relative position may be interchanged in other embodiments.

In the depicted embodiment the forward bearing 20 and the auxiliary bearing 30 are clamped together. As shown, the inner races 23, 32 of the bearings 20, 30 are axially secured between an axial fastener 40 and a shoulder 41 of the low-pressure engine shaft 17. In the embodiment shown, such shoulder 41 is an integral part of the low-pressure engine shaft 17, but it may be formed of a separate part connected (fastened or otherwise secured) to the low-pressure engine shaft 17 in alternate embodiments. The axial fastener 40 may be a nut screwed on the low-pressure engine shaft 17, for instance. Other axial fastener 40 may be contemplated. As shown, the auxiliary bearing 30 inner race 32 abuts against the shoulder 41 of the low-pressure engine shaft 17, and the forward bearing 20 inner race 23 is located between the inner race 32 of the auxiliary bearing 30 and the axial fastener 40. Such bearing arrangement may be referred to as a tandem arrangement in some embodiments.

The forward bearing 20 and the auxiliary bearing 30 remain at a fixed distance with respect to each other. In other words, the forward bearing 20 and the auxiliary bearing 30 are coupled together such that their relative axial position is fixed (fixed or substantially fixed) whether or not the gas turbine engine 2,3 is run in the standby mode.

In the depicted embodiment, the outer race 21 of the forward bearing 20 defines a radially extending flange 25 interfacing with the engine casing 22 such as to prevent (or block) axial movement of the forward bearing 20 outer race 21 relative to the engine casing 22 in a rearward direction (the rearward direction being defined as rearward, along the low-pressure engine shaft 17, in that it points away from the gearbox 4 or stated differently towards the turbine section 13).

While the forward bearing 20 and the auxiliary bearing 30 are shown in direct contact with one another via a portion of their respective inner races 23, 32, the forward bearing 20 and the auxiliary bearing 30 may be otherwise connected or secured to one another via an intermediate part in other embodiments.

The auxiliary bearing 30 is configured to generate an axial preload force on the forward bearing 20. The auxiliary bearing 30 includes a hydraulic device 34, which is integrated with, or stated differently integral to, the auxiliary bearing 30. More particularly, in the depicted embodiment, the hydraulic device 34 is integrated in the outer race 31 of the auxiliary bearing 30. The hydraulic device 34 is integrated or "integral" with the auxiliary bearing 30 in that the bearing 30 itself has portions of its body defining components or parts of the hydraulic device 34, as opposed to be a standalone hydraulic device 34 made of separate components added and adapted to the bearing assembly 18 or engine casing 22. Integrating the features of the hydraulic device 34 in components of the auxiliary bearing 30 allows for minimizing the space required for such device and its associated weight, for instance. Limiting the number of movable parts may also be desirable to limit the required maintenance of the hydraulic device 34 over time.

In the depicted embodiment, the hydraulic device 34 includes an oil piston 34A. The outer race 32 of the auxiliary bearing 30 defines a flange 35. Such flange 35 extends radially outwardly. In other words, the flange 35 extends radially away from the rolling elements 33 (or radially away from the inner race 31). Depending on the embodiment, the flange 35 may be an axially forward flange or an axially rearward flange of the bearing when viewed along the longitudinal axis of the engine. In FIG. 5, the flange 35 is an axially rearward flange 35, in that it is located aft of the rolling elements 33 relative to the forward bearing 20 when viewed along the rotation axis R-R of the low-pressure engine shaft 17. FIG. 6 shows an alternate embodiment of the bearing assembly 18, where, in this case the flange 35 is a axially forward flange 35, which is located axially forward of the auxiliary bearing 30, between the forward bearing 20 and the rolling elements 33 of the auxiliary bearing 30.

Returning to FIG. 5, the flange 35 defines at least part of the oil piston 34A of the auxiliary bearing 30. The oil piston 34A defines a surface area on which oil pressure is applied. Such surface area is one factor affecting the capacity of the hydraulic device 34 to exert an axial load and may affect the magnitude of that load. As shown, an oil chamber 36 (or piston cavity) is circumscribed at least partially by the flange 35. In the depicted embodiment, the oil chamber 36 is defined axially between the flange 35 and a wall of the engine casing 22. While the Figures show these components in an axial cross-section, it should be understood that the oil piston 34A, including the flange 35, oil chamber 36 and/or other components of the hydraulic device 34 may extend circumferentially about at least part of the low-pressure engine shaft 17. For instance, in an embodiment, the flange 35 and the oil chamber 36 extends continuously over the full circumference (360°) of the bearing 30. This may ensure that the axial load generated by the hydraulic device 34 on the bearing assembly 18 is applied uniformly around the low-pressure engine shaft 17. Even if less desirable, the oil chamber 36 and/or flange 35 may not extend continuously over the full circumference of the bearing 30 depending on the embodiments. For instance, there may be more than one oil chamber 36, i.e. a plurality of discrete oil chambers distributed at selected location about the bearing 30 with a corresponding number of flange segments to define a multiple oil pistons 34A system.

Such oil chamber 36 is sealed. The flange 35 is in sealing engagement with the engine casing 22, such that oil chamber 36 can contain oil and sustain oil pressure required to operate the hydraulic device 34. An oil supply 37 of the engine 2,3 may feed oil to the oil chamber 36 via an oil channel 38. While the oil supply 37 and oil channel 38 are illustrated proximate to each other in FIG. 5, the oil supply 37 may be located at another location (location or in another portion) within the engine 2,3. Oil may be supplied by an hydraulic system not only fluidly connected to the hydraulic device 34, but also other systems or components of the engine 2,3 that may require lubrication or oil flow. Stated differently, the hydraulic device 34 may not have a dedicated oil supply 37 or oil system. As such, oil may be channeled through at least part of the engine 2, 3 before reaching the oil supply 37 and/or the oil chamber 36. For instance, the oil supply 37 may be part of the engine lubrication system. However, in other cases, there may be a separate hydraulic system with a dedicated pump (not shown) to feed the hydraulic device 34.

In the depicted embodiment, the outer race 31 of the auxiliary bearing 30 is configured to move axially relative to the engine casing 22. The outer race 31 is not fixed relative to the engine casing 22. The outer race 31 may also move relative to the inner race 32, which is axially fixed and coupled to the low-pressure engine shaft 17. During operation of the hydraulic device 34, pressurized oil may be supplied into the oil chamber 36 to apply an axial load on the flange 35. The rolling elements 33 may thus oppose to the axial movement of the outer race 31. The outer race 31 axially loading the rolling elements 33 may in turn transmit the axial load to the inner race 32 of the bearing 30 (reaction force of the fixed inner race 32 opposing the axial load generated at the outer race 31). Such axial load generated by the hydraulic device 34 is transmitted to the forward bearing 20 as a consequence of the tandem configuration of the forward and auxiliary bearings 20, 30. In the depicted embodiment, a fixed distance between the forward and auxiliary bearings 20, 30 is maintained while the axial preload force is generated on the bearings 20, 30. The low-pressure engine shaft 17 may thus be biased rearwardly (i.e. in the rearward direction, towards the turbine section 13 or away from the gearbox 4).

The above also applies to the alternate embodiment shown in FIG. 6. One difference in FIG. 6 is the location of the oil chamber 36 relative to auxiliary bearing 30. As shown, in the depicted embodiment of FIG. 6, the oil chamber 36 of the hydraulic device is defined between the flange 35 and the engine casing 22 similarly as discussed above. However, in FIG. 6, the oil chamber 36 is located axially between the forward bearing 20 and the auxiliary bearing 30. The flange 35 is in sealing engagement with the engine casing 22, just as in FIG. 5. The oil chamber 36 is thus circumscribed by a wall of the engine casing 22 and the flange 35 in sealing engagement therewith. The bearings 20, 30 illustrated in a tandem configuration are axially maintained at a fixed distance from each other, between the axial fastener 40 and the shoulder 41 of the low-pressure engine shaft 17.

The so-generated axial load by the hydraulic device 34 and bearings 20,30 in the tandem configuration as discussed above may compensate for the lack of aerodynamic load (lack of sufficient aerodynamic load, or absence of aerodynamic load) as a consequence of the standby mode operating condition of the engine 2,3 so affected. Such biasing force may oppose to vibrations and/or limit axial load fluctuations (also known as "chucking loads") transmitted to the bearings 20, 30. The hydraulic device 34 may be sized to allow generating sufficient axial pre-load force for compensating the lack of aerodynamic load typically present when at the engine 2,3 is operated in standby mode. In some embodiments, oil may be supplied at a constant pressure on the outer race 31 (the flange 35) to apply a constant pre-load force, irrespective of the actual level of aerodynamic load. In other embodiments, while less desirable as it adds components in the engines 2,3, which may thus affect the engines weight, a valve or other pressure regulator may be used to limit or control the oil pressure. In such cases, the pre-axial load force may be adjusted to a selected force level depending on the amplitude of aerodynamic load to compensate for. Such controllable valve may be controlled via one or more controller(s) (such as the exemplary controllers described above).

While the hydraulic device 34 described herein may advantageously provide an axial pre-load force on the low-pressure engine shaft 17 via the auxiliary bearing 30 when the gas turbine engine 2,3 run in the standby mode, such axial pre-load force may be continuously applied on the low-pressure engine shaft 17, whether or not the engine 2,3 is operating in the standby mode. Stated differently, in some embodiments, while less advantageous than in the standby mode, the axial pre-load force generated by the hydraulic device 34 may be applied while the engine 2,3 is operated in the full-power mode or "active". This may allow simpler hydraulic systems, as no valve(s) or electronic actuator(s) may be required to control and/or vary the oil feed and/or oil pressure channeled to the hydraulic device 34. This may consequently simplify the hydraulic system and reduce weight of the engines 2,3 comprising such hydraulic device 34.

The hydraulic device 34 described herein may stabilize the load applied on the rolling elements of the bearings and maintain the position of the rolling elements, which may contribute in maximizing service life of the forward bearing 20 and/or auxiliary bearing 30. Because of the reduced amount of moving parts in the hydraulic device 34, such device 34 may be easier to install and last longer than other types of devices that would use springs, for instance.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the embodiments set forth in the examples, but should be given the broadest interpretation consistent with the description as a whole.

The invention claimed is:

1. A method of operating a gas turbine engine of a multi-engine aircraft, the gas turbine engine having an engine shaft mounted for rotation in a bearing of a bearing assembly, the method comprising:
    limiting motive power supplied to the aircraft by the gas turbine engine by operating the gas turbine engine in a standby mode; and
    at least when the gas turbine engine is operating in the standby mode, using an oil piston integrated in the bearing supporting the engine shaft of the gas turbine engine to generate an axial preload force on the bearing.

2. The method as defined in claim 1, further comprising operating another gas turbine engine of the multi-engine aircraft in an active mode to supply a larger amount of motive power to the aircraft than the gas turbine engine operated in the standby mode.

3. The method as defined in claim 2, wherein the gas turbine engines drive a common load, wherein operating one of the gas turbine engine in the standby mode supplies none of a required motive power to the common load, while the gas turbine engine in the active mode supplies all of the required motive power to the common load.

4. The method as defined in claim 1, wherein using the oil piston includes supplying pressurized oil into a piston cavity of the bearing assembly from an oil supply of the gas turbine engine.

5. The method as defined in claim 1, the oil piston being integrated in an outer race of the bearing, wherein using the oil piston includes applying the axial preload force on a flange of the outer race of the bearing.

6. The method as defined in claim 1, wherein using the oil piston includes biasing axially an inner race of the bearing against a shoulder defined on the engine shaft to load the engine shaft in a direction of the axial preload force.

7. The method as defined in claim 1, wherein using the oil piston includes supplying pressurized oil at a constant pressure on the outer race of the bearing to generate the axial preload force.

8. The method as defined in claim 1, wherein the bearing of the bearing assembly is a first bearing, the bearing assembly including a second bearing, the first and second bearings mounted in a tandem configuration, the method comprising maintaining a fixed distance between the first and the second bearing in the tandem configuration while applying the axial preload force.

9. The method as defined in claim 8, wherein using the oil piston includes applying the axial preload force on the first bearing and the second bearing in a rearward load direction along the engine shaft.

10. The method as defined in claim 8, the first and second bearings having each having an inner race axially secured to the engine shaft, wherein applying the axial preload force on the first and second bearings in the rearward load direction includes biasing the engine shaft in the rearward load direction to compensate for a lack of aerodynamic load on the engine shaft.

11. A method of providing a preload force on a bearing of a bearing assembly, the bearing supporting a shaft in a gas turbine engine, the method comprising:
using an oil piston integrated into a flange of the bearing to apply an axial force on an outer race of the bearing, the axial force being applied continuously on the bearing during operation of the gas turbine engine, wherein applying the axial force on the outer race includes biasing axially an inner race of the bearing via rolling elements of the bearing interfacing between the outer race and the inner race against a complementary shoulder of the engine shaft to load the engine shaft in a rearward load direction along a rotation axis of the gas turbine engine.

12. The method as defined in claim 11, wherein using the oil piston includes supplying pressurized oil at a constant pressure on the flange of the bearing.

13. The method as defined in claim 11, wherein the flange at least partially circumscribes a piston cavity, the method comprising adjusting an oil pressure exerted on the flange to a desired pressure via an oil valve fluidly connected upstream of the piston cavity.

14. The method as defined in claim 11, the bearing being a first bearing, the bearing assembly including a second bearing mounted in a tandem configuration with the first bearing, wherein using the oil piston includes biasing the first and the second bearings in a rearward load direction along a rotation axis of the gas turbine engine.

15. A bearing assembly for supporting an engine shaft, comprising:
a bearing having an inner race, an outer race and a series of rolling elements disposed between the inner race and the outer race, the inner race of the bearing coupled to the engine shaft, the outer race of the bearing defining a flange; and
an oil piston integrated into the bearing flange, the oil piston including a piston cavity, the bearing flange at least partially circumscribing the piston cavity, the oil piston configured to apply an axial preload force against the rolling elements of the bearing and in turn to the engine shaft coupled to the bearing inner race, wherein the bearing is a first bearing, the bearing assembly comprising a second bearing, the second bearing mounted to the engine shaft, the first bearing and the second bearing each having an inner race, the inner races of the first and second bearings axially secured to the engine shaft and contacting each other; and wherein the engine shaft defines a shoulder, the inner race of the first bearing abutting against the shoulder and the inner race of the second bearing abutting against the inner race of the first bearing.

16. The bearing assembly as defined in claim 15, wherein the bearing has rolling elements interfacing between the outer race and an inner race, the flange being axially offset from the rolling elements, the flange extending radially outward from the rolling elements.

17. The bearing assembly as defined in claim 15, wherein the inner races of the first and second bearing are clamped on each other between the shoulder and an axial fastener engaging the engine shaft.

* * * * *